Patented May 4, 1954

UNITED STATES PATENT OFFICE 2,677,614

METHOD OF PREPARING SMOKED YEAST PRODUCTS

Curtis Freshel, New York, N. Y.

No Drawing. Application April 9, 1951, Serial No. 220,131

1 Claim. (Cl. 99—96)

This invention relates to yeast products and method of preparing the same and more particularly to naturally flavored yeast.

The advantages of yeast for human consumption have long been recognized but its direct consumption has not been extensive because it is distasteful to the majority of people. For the same reason yeast has not been incorporated in many food products although its inclusion would greatly enhance their food value and it would provide an inexpensive source of highly desirable vitamins.

All of these objections to yeast for direct consumption or for inclusion in other food products would be overcome if the yeast could be given a desirable flavor. The present invention accordingly has for its principal object the provision of a flavored yeast product and a method of preparing the same.

Another object is to provide a product and a method in which the flavor is added to the yeast during its growth to be incorporated naturally therein. According to the preferred method the flavor is added to the solution in which the yeast is grown.

In carrying out the invention a solution is prepared which is capable of supporting yeast growth such as the conventional molasses solution for primary grown yeast. The exact solution employed is not critical and any solution in which primary grown yeast can be grown can be used equally well.

To the growing solution there is added either a natural or synthetic flavoring which it is desired to have the yeast acquire. The flavoring is preferably one having a relatively strong or pungent taste which will be acquired by the yeast during its growth and will be retained by it even after it has been dried.

One very satisfactory group of flavorings are those containing fats or oils, herein designated oily components. Examples of such flavorings include distilled wood tars, known as "liquid smoke," or the wood tars themselves which will produce a yeast having a smoked flavor. Various types of mint or mint essences such as peppermint or spearmint can be used to produce a yeast with a corresponding mint flavor. Chocolate can be used in the same way to produce yeast with a natural chocolate flavor. Spices or herbs such as clove, cinnamon, basil and the like can also be used to impart their flavors to the yeast. Other natural or synthetic flavorings or mixtures of the same general type containing an oily component will impart their flavors to the yeast during its growth.

The solution is seeded with a desired yeast strain either before or after addition of the flavoring material and is maintained under conditions favorable for yeast growth. Preferably the solution is maintained at a temperature slightly less than 60° C. and well within the growing range of 4° to 60° C. for a period of three to four days during which the yeast growth occurs. As the yeast grows it will acquire naturally the taste of the particular flavoring employed.

The yeast can be removed from the solution and pressed into cakes or dried into a granular mass in the usual manner and is then ready for use. The flavored yeast can be eaten or can be incorporated in other food products without producing the taste effect usually associated with yeast. In fact the taste of the yeast is pleasing and it can be used in many cases to improve the taste of other food products with which it is used.

According to another method the flavoring can be injected into the growing solution in the form of a gaseous material such as gas or vapor to replace or supplement the air usually pumped into the solution to agitate it during the growth period. For example, wood smoke or a mixture of smoke and air can be pumped into the solution during the growth period and the smoke flavor will be taken up by the solution and imparted to the yeast during its growth. Smoke produced by burning mint, spices, herbs and the like can be used in a similar manner to produce a yeast having a corresponding taste. Alternatively extracts of wood, mint, spices, herbs and the like containing an oily component can be vaporized and injected into the growing solution either alone or mixed with air to have their flavor imparted to the yeast.

It will be understood that the invention is not limited to the exact flavorings named herein nor otherwise than by the terms of the appended claim.

What is claimed is:

The method of preparing yeast which comprises preparing a solution capable of supporting yeast growth, seeding the solution with yeast, and forcing smoke under pressure into the solution to simultaneously agitate and flavor the solution and impart to the yeast during its growth a smoke flavor, and then recovering the yeast from the solution.

References Cited in the file of this patent

UNITED STATES PATENTS

| Number | Name | Date |
|---|---|---|
| 180,224 | Gschwing | July 25, 1876 |
| 587,771 | Vredenburg | Aug. 10, 1897 |
| 1,479,502 | Heffle | Jan. 1, 1924 |
| 1,919,612 | Block | July 25, 1933 |
| 1,981,225 | Freshel | Nov. 20, 1934 |

FOREIGN PATENTS

| Number | Country | Date |
|---|---|---|
| 65,661 | Denmark | Sept. 27, 1947 |